United States Patent [19]
Capel

[11] Patent Number: 5,138,249
[45] Date of Patent: Aug. 11, 1992

[54] CIRCUIT FOR REGULATING A PARAMETER BY MEANS OF A BIDIRECTIONAL CURRENT STRUCTURE

[75] Inventor: Antoine Capel, Ramonville, France
[73] Assignee: Alcatel Espace, Courbevoie, France
[21] Appl. No.: 711,831
[22] Filed: Jun. 7, 1991
[30] Foreign Application Priority Data
  Jun. 8, 1990 [FR] France ................................ 90 07151
[51] Int. Cl.$^5$ ...................... H02M 3/335; G05F 1/62
[52] U.S. Cl. .................................. 323/283; 323/285; 363/25; 363/124
[58] Field of Search ............... 323/282, 283, 284, 285; 363/124, 24, 25, 26, 97

[56] References Cited
U.S. PATENT DOCUMENTS

| | | | |
|---|---|---|---|
| 4,034,280 | 7/1977 | Cronin et al. .......................... | 363/25 |
| 4,161,023 | 7/1979 | Goffeau ............................... | 363/124 |
| 4,251,857 | 2/1981 | Shelly ................................... | 363/26 |
| 4,661,896 | 4/1987 | Kobayashi et al. ................... | 363/124 |
| 4,672,303 | 6/1987 | Newton ................................ | 323/285 |
| 4,729,088 | 3/1988 | Wong .................................... | 363/124 |
| 4,905,136 | 2/1990 | Tanaka .................................. | 363/24 |
| 4,931,716 | 6/1990 | Jovanovic et al. ................... | 323/285 |

OTHER PUBLICATIONS

ESA Journal, vol. 10, 1986, pp. 387-402; A. Capel & J. C. Marpinard: "A Bi-Directional High-Power Cell Using Large-Signal Feedback Control with Maximum Current Conduction Control for Space Applications".

Primary Examiner—Peter S. Wong
Attorney, Agent, or Firm—Sughrue, Mion, Zinn, Macpeak & Seas

[57] ABSTRACT

A circuit for regulating a parameter by means of a bidirectional current chopper structure suitable for transferring energy from an input network to an output network via the bidirectional current chopper structure, the current flowing through the structure being in the form of a triangular wave. The circuit is particularly suitable for space applications.

9 Claims, 4 Drawing Sheets

CIRCUIT FOR REGULATING A PARAMETER BY MEANS OF A BIDIRECTIONAL CURRENT STRUCTURE

BACKGROUND OF THE INVENTION

The invention relates to a circuit for regulating a parameter by means of a bidirectional structure under peak current control with stabilizing control by state feedback, and with or without metallic isolation.

The circuit of the invention may be used whenever a timevarying parameter is to be servo-controlled with high energy efficiency. Its applications extend to radar, to motor control, to D class amplification, to inverters, etc. . . . and regardless of the field in which it is used: space, aviation, consumer.

Nevertheless, the invention is also applicable to regulation that is continuous or slowly varying.

The state of the art makes use of regulator-modulator associations that operate in frequency space and in state space.

An application for a radar is described in the article by A. Capel, J. C. Marpinard, G. Sahet, M. Valentin and D. O'Sullivan, entitled "A bidirectional high power cell using large signal feedback control with maximum current conduction control for space applications" (ESA Journal, 1986, Vol. 10). It makes use of a buck regulator and a current controlled modulator, operating both with negative values and with positive values. The principle whereby the current flowing in the regulator i(t) is compared with a calculated current $i_M$ is such that:

the permanently measured current is the current flowing through the inductor downstream from the FET switches such that if a short circuit occurs at the shunt switch, the system does not apply current limitation since the measured current is zero;

the control law makes use of AC in the capacitor;
the control function Vc(t) has the form:

$$Vc(t) = i(nT) + \begin{cases} T\lambda(t)[V(t) - Vo(t)]/L & \text{in buck mode} \\ -T[1 - \lambda(t)] \cdot Vo(t)/L & \text{in boost mode} \end{cases}$$

the modulator makes use of the gains of the zero order blockers of the non-liner function multipliers and dividers.

The same publication describes another application for a radar making use of a buck cell with a simplified modulator. It differs from the above in that its control law does not make use the capacitor AC.

This concept does not make use of peak current control and it makes use of a comparator in the form of a pulse width modulator (PWM) function.

An object of the invention is to improve such a structure.

SUMMARY OF THE INVENTION

To this end, the present invention provides a circuit for regulating a parameter by means of a bidirectional current structure, enabling energy to be transferred from an input network to an output network through the bidirectional current chopper structure, current flowing through said structure in the form of a triangular wave, wherein the circuit enables energy to be transferred by using an external clock which fixes the chopper frequency of the regulator and stops energy transfer whenever the peak value of the measured input current is such that:

$$i1(t) = G.Vc \text{ if } D < 0.5$$

$$i1(t) = G.Vc - Ko.t \text{ if } 0 \leq D \leq 1$$

where $D = tc/T$, T is the period of the external clock, tc is the conduction time of the bidirectional structure, and G is a constant.

Associating a current controlled modulator with stabilizing control by state feedback makes it possible to control the peak current and to protect the power units against surge currents even when short circuits occur in the structure or in its input or load networks. If the peak current is less than the maximum value permitted by the most vulnerable components in the power structure, then the structure is in any case protected against the risk of breakdown due to current surge, regardless of the direction of current flow.

By generating the control function Vc(t) using a stabilizing control by state feedback, it is possible to extend its advantages to the dynamic behavior of the system which can perform energy exchanges accurately by causing any excess energy that could give rise to deregulation of the servo-control parameter to flow immediately in the opposite direction.

Such a system is thus capable of servo-controlling a parameter to a reference command that varies in time such as a class A linear amplifier except that the chopping technique makes it possible to implement this function with high energy efficiency that is limited solely by the conduction and switching losses in the switches.

The function Vr(t) may be in the form of pulses, a square wave, a sawtooth wave, or a sinewave, and its response is of the same type with efficiency close to 1.

This feature of associating the structure with a modulator makes the association particularly advantageous in radar applications, motor control applications, etc. . . . .

BRIEF DESCRIPTION OF THE DRAWINGS

Embodiments of the invention are described by way of example with reference to the accompanying drawings, in which.

DETAILED DESCRIPTION OF THE PREFERRED EMBODIMENTS

Figure 1:
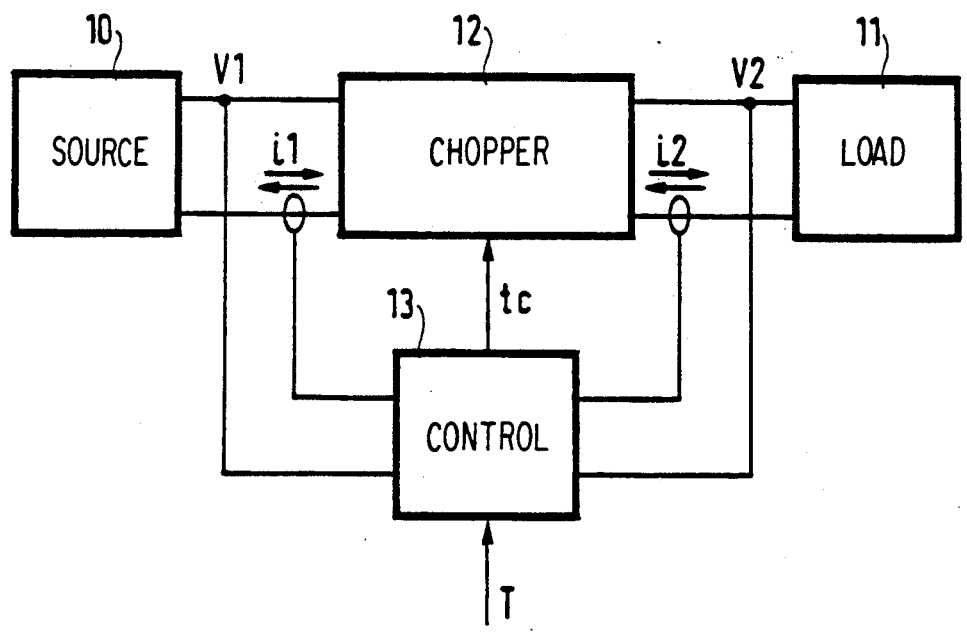
FIGS. 1, 2, and 3 show a structure of the invention.

The circuit of the invention associates a chopper electrical structure 12 under servo-control based on stabilizing control by state feedback having the features of being able to apply peak current control to the bidirectional current power unit with or without metallic isolation, as shown in the diagram of FIG. 1.

Between the input network 10 and the output network 11 there is a bidirectional regulator structure 12. A modulator 13 synchronized by an external clock T and receiving the input and output voltages V1 and V2 and the input and output currents i1 and i2 serves to control this bidirectional structure 12 via a link tc.

Energy E is transferred from the "input" network 10 to the "output" network 11 through the bidirectional current chopper structure 12 by control that implements the following two equations simultaneously:

$$E = V1 \int_0^{tc} i1 \, dt \text{ and}$$

$$V2 = V1(i2/i1)$$

where V1, i1 and V2, i2 are the voltages and currents applied to the chopper structure and where tc is the conduction time of said structure operating at a fixed frequency f=1/T.

Figure 2:
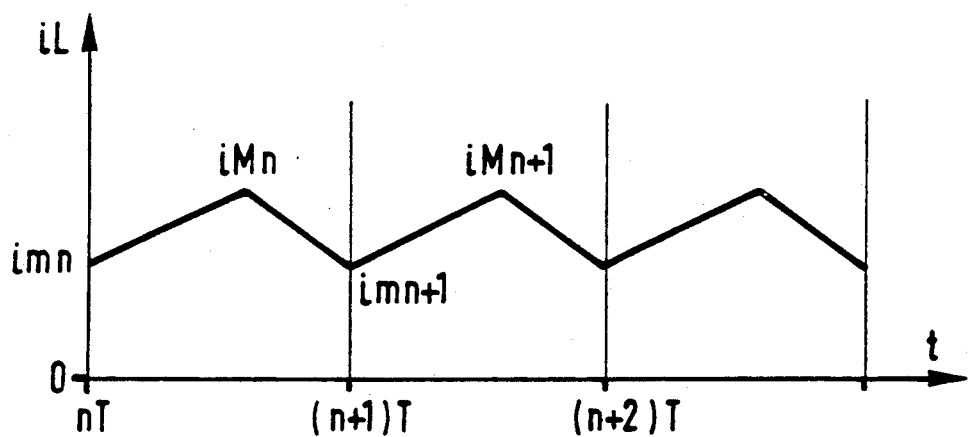

The variable current iL which flows through said power structure 12 is triangular in waveform whatever the type of structure, and under equilibrium conditions it has the appearance shown in FIG. 2. It is characterized by a minimum value imn and by a peak value iMn.

By associating a current controlled modulator 13 with a stabilizing control by state feedback, it is possible to control the peak current by applying a law of the following form to the servo-control if the duty ratio D=tc/T is less than 50%:

$$iM = G.Vc(tc),$$

and if the duty ratio may reach 100%, by a law having the form:

$$iM = G.Vc(tc) - Ko.tc$$

where tc=T and where Ko and G are constants.

The positive and negative values of this peak current are controlled by means of a suitable sensor so that the servo-control applies regardless of whether current is flowing from the network 10 to the network 11, or vice versa, as indicated in FIG. 1. The sensors used are sensors having a very fast response, e.g. Hall effect sensors.

In the two above equations, this gives rise to limiting of the form:

$$G.Vc(tc) \leq G.VM$$

or $$G.Vc(tc) - Ko.tc \leq G.VM$$

where VM is a constant. This imposes:

$$iM \leq IM$$

where IM is a constant determined by the designer.

Such limiting serves to protect the power unit against current surges even when short circuits occur in the structure or in the networks 10 or 11. If IM is less than the maximum value that can be accepted by the most vulnerable components in the power structure, then the structure is in any event always protected against the risk of failure by current surge, regardless of the direction of current flow.

By generating the function Vc(t) using stabilizing control by state feedback it is possible to extend these advantages to the dynamic behavior of the system where energy interchanges can be measured out exactly by causing any excess energy that might deregulate the servo-control parameter to pass immediately in the opposite direction.

Figure 3:
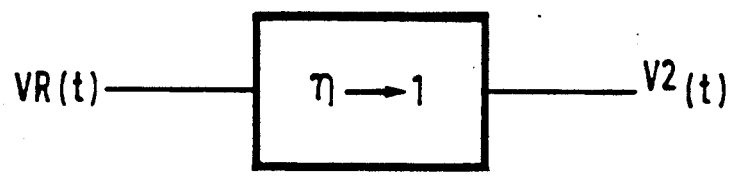

Such a system can thus be used to servo-control a parameter to a command VR(t) that varies over time, in the same manner as a class A linear amplifier, except that the chopper technique makes it possible to perform this function at high energy efficiency, with efficiency being limited by the switching and conduction losses of the switches, as shown in FIG. 3.

The function VR(t) may be in the form of pulses, a square wave, a sawtooth wave, or a sinewave, and the response V2(t) will be of the same type with efficiency n close to 1.

This feature makes such an association of a structure 12 with a modulator 13 particularly advantageous in radar applications, motor control applications, etc. . . . .

Associated with a push-pull cell or the like and with a transformer, the above performance can be combined with metallic isolation as is required in some applications between the grounds of the networks 10 and 11.

The modulator 13 makes use of linear functions only (amplifiers) which, in association with voltage and current sensors are used to generate the function Vc(t).

This function has the form:

$$Vc(t) = (1-K).k1.(VR-V2) + k2.V2 + k3.i2 + k4.V1$$

where the coefficients kn are the gains associated with the measured parameters of the system. These parameters V1, V2, i2, VR, . . . may vary over time.

K is a constant which sets the dynamic range of the chopper regulator and whose value is limited to the range $$0 \leq K \leq 1$$

| if | K → | 0 the system is fast |
|---|---|---|
|  | K → | 1 the system is slow. |

The values of kn, and Ko are fixed by dynamic analysis of the looped system in space state and by the specifications given to the designer.

Regulation is based on setting up the energy transfer process by means of an external clock T which sets the chopper frequency of the regulator, and in stopping transfer by means of a logic circuit when the permanently measured current i1(t) is such that:

$$i1(t) = G.vc \text{ if } D < 0.5$$

$$i1(t) = G.vc - Ko.t \text{ if } 0 \leq D \leq 1$$

This system applies to all chopper structures of the PWM type having a law of the form:

$$Vc(t) = (1-K).k1.(VR-V2) + k2.V2 + k3.i2 + k4.V1$$

The simplicity with which it is implemented makes it easily standardizable in the form of n amplifiers if the system has n variable parameters, together with a comparator and a logic circuit for controlling the switches.

Figure 4:
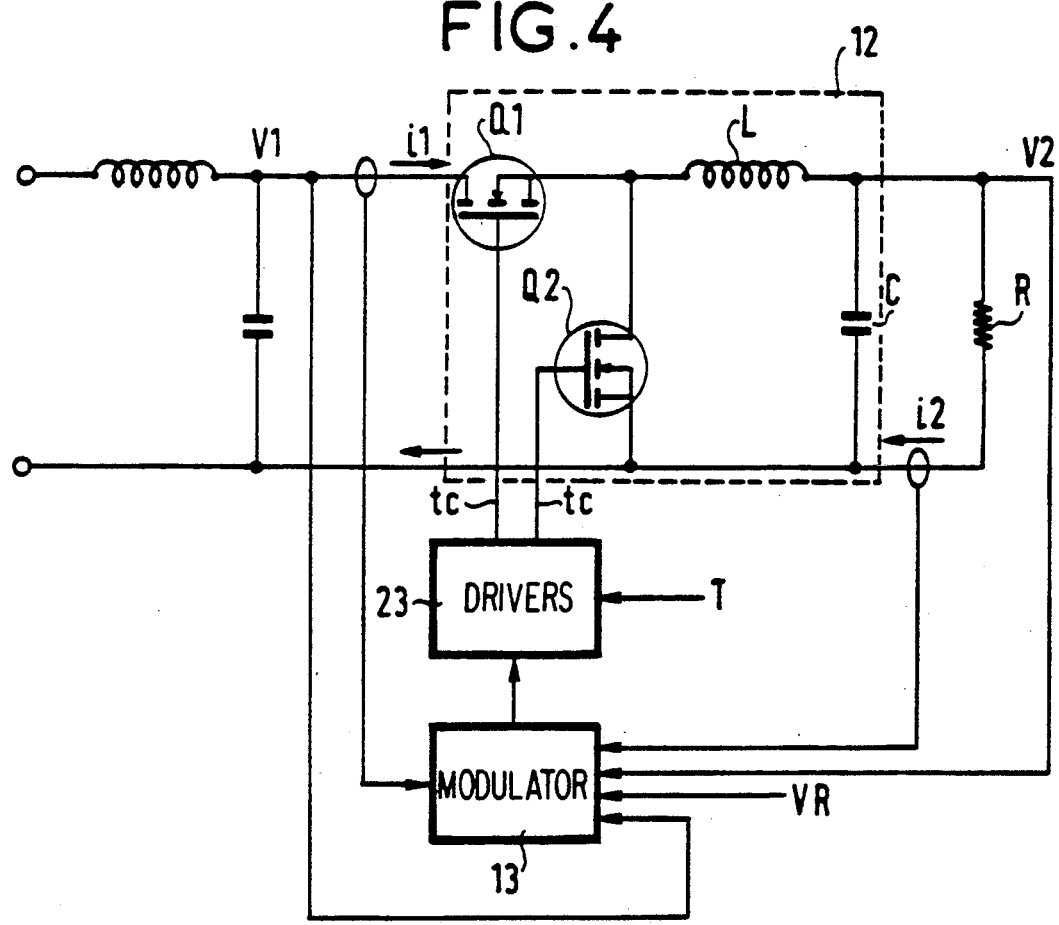
FIG. 4 shows a regulator without metallic isolation.

When using buck type chopper regulation, the association of the power structure and the modulator is shown in FIG. 4 for a space type radar application.

The application includes a bidirectional buck power structure constituted by two FETs Q1 and Q2, an inductor L, a capacitor C, and driver stages 23 associated with the transistors Q1 and Q2.

In series between its inputs and its output, the structure 12 comprises the first transistor Q1 and the inductor L, and the second transistor Q2 in parallel between the ground lines and the midpoint between Q1 and L, with the capacitor C being connected between the output and the ground line.

Figure 6:
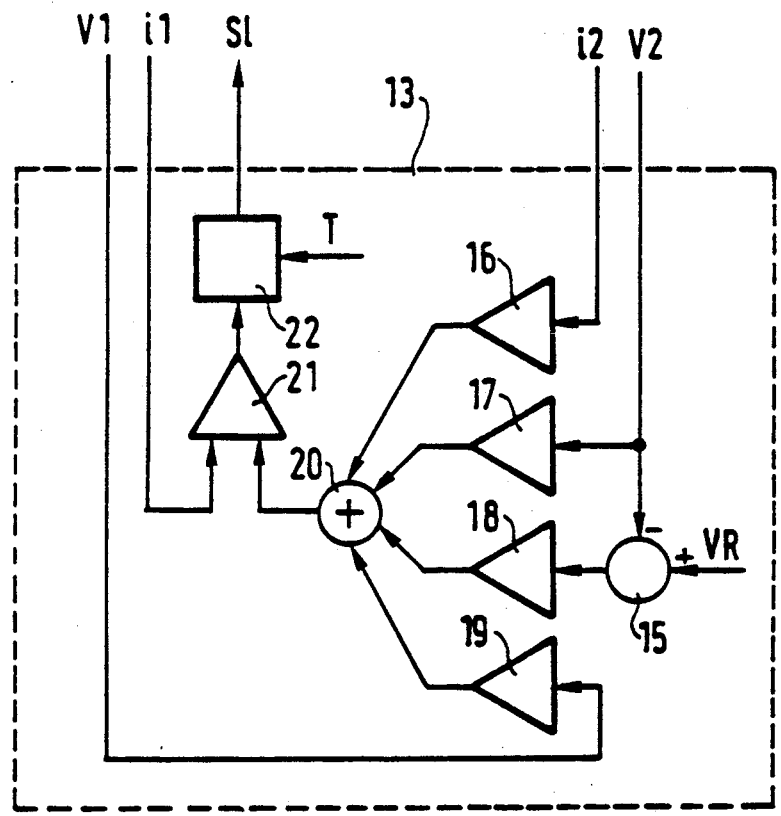
FIG. 6 shows a special circuit of the regulator of the invention.

The modulator 13 has five functions:

(1) It generates the function Vc(t) using four amplifiers 16, 17, 18, and 19, as shown in FIG. 6, the amplifiers having respective gains of k3, k2, k1. (1−K), and k4, with their respective inputs receiving: the output current i2(t), the output voltage V2(t), the difference between the pulse reference VR(t) and the output voltage V2(t), and the input voltage V1(t). By integrating the voltage VR−V2 on the amplifier 18 it is possible to take account of a correction term in the state representation.

(2) It permanently measures the current i1(t) from the energy source and flowing through the power cell.

(3) A comparator 21 generates a logic signal S1 whenever i1(t)=Vc(t).

(4) The clock T controls the system.

(5) The logic circuit excites the complementary FET switches which receive pulses of widths tc and $\overline{tc}$ such that tc+$\overline{tc}$=T.

Each parameter is thus associated with a gain.

The four output signals from the amplifiers are summed in a summing circuit 20 to obtain a signal Vc(t) which is used by the comparator for comparing with the measured signal value which is the peak current.

Figure 5:
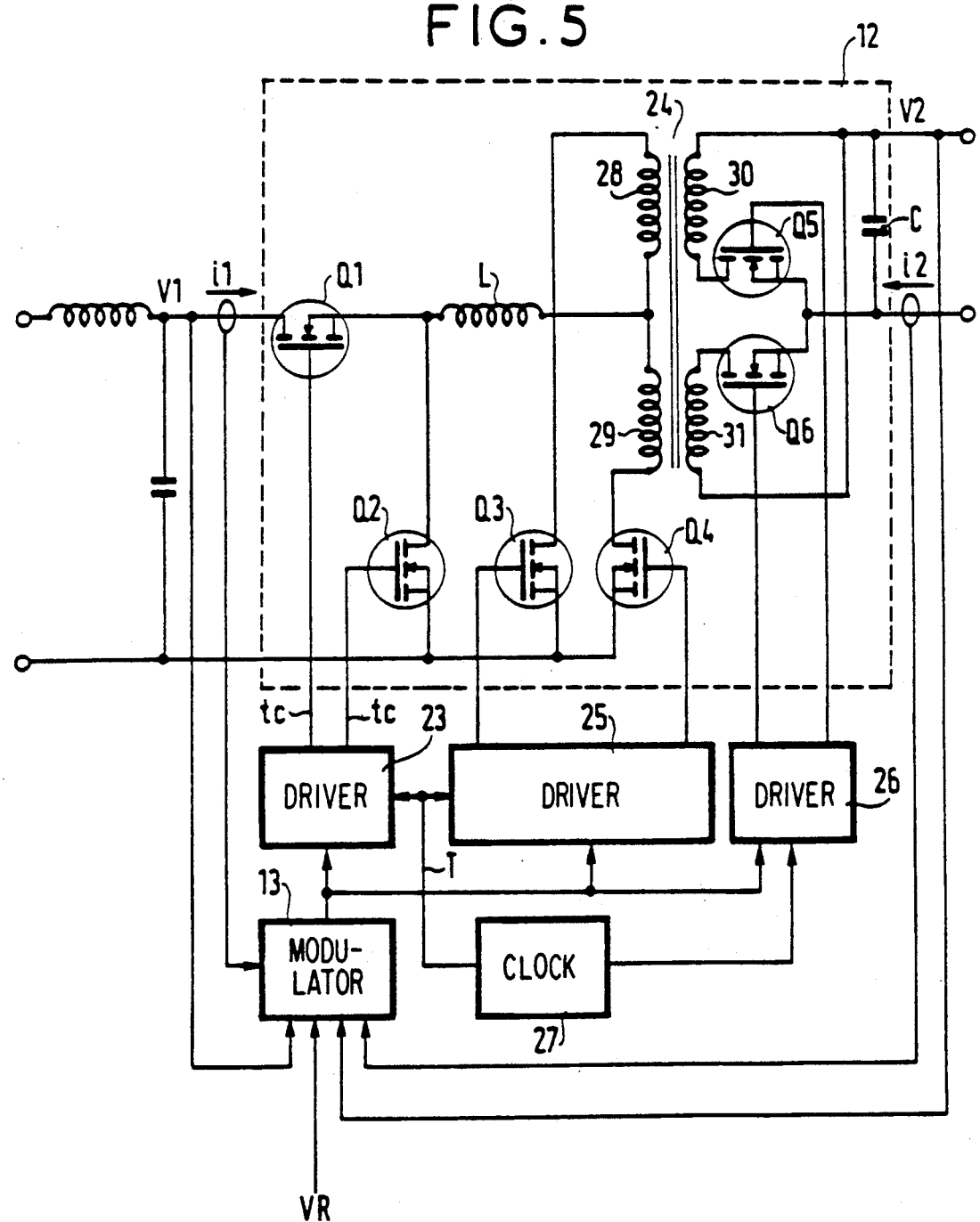
FIG. 5 shows a regulator with metallic isolation.

Although the method is applicable to all applications of chopper regulators, it is shown without metallic isolation in the diagram of FIG. 4 and with metallic isolation in the diagram of FIG. 5.

A regulator without metallic isolation thus consists in a buck cell constituted by the switches Q1 and Q2 and the filter LC associated with the driver stages 23 for the switches and with the state feedback stabilizing control 13.

The principle of stabilizing control is known to the person skilled in the art so the description of the invention bears on the electrical circuit of the preferred application, that of an electrical power supply for radar.

The purpose of the modulator 13 is to generate a function Vc(t) which represents the peak current value for the forthcoming period, in particular the period (n+1).

$$IM.(n+1)=(1-K).k1.(VR-V2)+k3.i2+k2.V2+k4.V1$$

The last term is advantageously replaced by an equation having the form:

$$k4.V1 \approx k\int(VR-V2)dt$$

where k is a constant for eliminating the static error of the system and is determined when the regulator is designed.

The constants kn in this buck application have the form:

$$k1=C/T$$

$$k2=1$$

$$k3=-T/L$$

The functions are performed using linear amplifiers and a current sensor (for sensing output current).

The switch Q1 is opened stopping the transfer of energy towards the load when at time t=tc the following are true:

$$Vc(tc)=i(tc)$$

$$Vc(tc)-ko.tc=i(tc)$$

This operation is performed by means of a high gain comparator whose inputs are connected to receive the information Vc(t).

The conduction times tc and $\overline{tc}$ respectively of the switches Q1 and Q2 are shaped by means of a bistable 22 which is initialized by a clock generated by a signal of the integrated circuit.

The switches Q1 and Q2 are controlled by means of a high speed circuit of the bootstrap type.

This function which makes use of seven integrated circuits, for example, is applicable to all types of chopper regulator and thus constitutes a standardizable function.

FIG. 5 is a circuit diagram of a regulator having metallic isolation, specifically for an SMART cell. It makes use of the same functions, but they are differently distributed because of the metallic isolation.

The structure 12 then comprises six FETs Q1, Q2, Q3, Q4, Q5, and Q6, a transformer 24, drivers 23, 25, and 26, and a clock circuit 27. The transformer 24 has two primary windings 28 and 29 and two secondary windings 30 and 31 and is disposed between the inductor L and the capacitor C as shown in FIG. 4. The point common to the two primary windings 28 and 29 is connected to the inductor L while the opposite ends of the primary windings are connected to the drains of the third and fourth transistors Q3 and Q4. The drains of the fifth and sixth transistors Q5 and Q6 are connected to respective ends of the two secondary windings 30 and 31, their common gates are connected to the ground line, and the other two ends of the secondary windings are connected to the output. The sources of the transistors are controlled by the drivers 23, 25, and 26 connected to the modulator 13.

In the modulator, the functions generating Vc(t) are to be found at the secondary since V2(t), VR(t) and i2(t) are referenced to the same ground as the load. The function V(t), if required, must be conveyed thereto via an isolating amplifier.

The comparator 21, the clock 27, and the logic circuits are associated with the primary, with the voltage Vc(t) being related to the primary by an isolating amplifier.

Naturally, the present invention is described and shown merely by way of preferred example and its component parts could be replaced by equivalent parts without thereby going beyond the scope of the invention.

I claim:

1. A servo-control circuit for regulating a parameter, said circuit comprising:
   an input network providing an input current and an input voltage;
   an output network receiving an output current and an output voltage;
   a bidirectional current chopper for transferring energy from said input network to said output network, current flowing through said bidirectional current chopper being in the form of a triangular wave; and
   a controller for measuring the input current i1(t), for controlling the transfer of energy in accordance with an external clock T which fixes a chopper frequency of said bidirectional current chopper, and for stopping energy transfer whenever a peak value of the measured input current i1(t) is such that:

$$i1(t) = G \cdot Vc \text{ if } D < 0.5$$

$$i1(t) = G \cdot Vc - Ko \cdot t \text{ if } 0 \leq D \leq 1$$

where $D = tc/T$, T is the period of the external clock, tc is the conduction time of the bidirectional current chopper, Vc is a command function based on a stabilizing control by state feedback, and Ko and G are constants.

2. A circuit according to claim 1, wherein said controller comprises a current controlled modulator with stabilizing control by state feedback, whereby the peak value is controlled so as to servo-control the output voltage V2(t) to a reference voltage (VR(t)).

3. A circuit according to claim 2, wherein said current controlled modulator makes use of linear functions only, which are associated with voltage and current sensors to generate the command function Vc(t), said voltage and current sensors measure parameters.

4. A circuit according to claim 3, wherein the command function has the form:

$$Vc(t) = (1-K) \cdot k1 \cdot (VR - V2) + k2 \cdot V2 + k3 \cdot i2 + k4 \cdot V1$$

where k1, k2, k3 and k4 are gains associated with the measured parameters; K is a constant such that $0 \leq K \leq 1$; and V1, V2, i2 and VR are the measured parameters, respectively, the input and output voltages, the output current, and the reference voltage.

5. A circuit according to claim 1, wherein said bidirectional current chopper comprises first and second transistors, an inductor, and a capacitor.

6. A circuit according to claim 5, wherein said bidirectional current chopper includes input and output terminals, and wherein the first transistor and the inductor are connected in series between the input and output terminals, the second transistor being connected in parallel between a midpoint (of the first transistor and the inductor) and a ground line, the capacitor being connected between the output terminal and the ground line.

7. A circuit according to claim 2, wherein said current controlled modulator comprises:

four amplifiers having respective gains k3, k2, k1·(1−K), and k4 having their respective inputs connected to receive the output current, the output voltage, a difference between the reference voltage and the output voltage, and the input voltage, and a summing circuit for summing the outputs of each of said amplifiers to obtain the command function which is used for comparison with the peak value of the measured input current.

8. A circuit according to claim 1, wherein said bidirectional current chopper comprises isolation means for providing isolation between the input and output networks.

9. A circuit according to claim 8, wherein said bidirectional current chopper includes input and output terminals, and wherein said bidirectional current chopper comprises an inductor, a capacitor, first through sixth transistors, a transformer, driver circuits, and a clock circuit; the transformer having two primary windings and two secondary windings and being disposed between the inductor and the capacitor, a point common to the two primary windings being connected to the inductor with the other ends of the primary windings being connected to the drains of the third and fourth transistors, the drains of the fifth and sixth transistors each being connected to one end of a respective one of the two secondary windings with their common gate being connected to a ground line, the two other ends of the secondary windings being connected to the output terminal, the first transistor being connected between the input terminal and the inductor, the second transistor being connected in parallel between a midpoint (of the first transistor and the inductor) and the ground line, the capacitor being connected between the output terminal and the ground line, and the sources of the transistors being controlled by the driver circuits.

* * * * *